United States Patent [19]

Tomite

[11] Patent Number: 4,491,756
[45] Date of Patent: Jan. 1, 1985

[54] DIRECT CURRENT DYNAMOELECTRIC MACHINE OF PERMANENT MAGNET TYPE

[75] Inventor: Tosio Tomite, Katsuta, Japan

[73] Assignee: Hitachi, Ltd., Tokyo, Japan

[21] Appl. No.: 435,278

[22] Filed: Oct. 19, 1982

[30] Foreign Application Priority Data

Oct. 21, 1981 [JP] Japan .............................. 56-167094
Nov. 11, 1981 [JP] Japan .............................. 56-179761

[51] Int. Cl.$^3$ ............................................ H02K 21/28
[52] U.S. Cl. ................................. 310/154; 310/254
[58] Field of Search ............... 310/154, 181, 254, 258

[56] References Cited

U.S. PATENT DOCUMENTS

| | | | |
|---|---|---|---|
| 3,469,129 | 9/1969 | Humphreys | 310/154 |
| 3,567,979 | 3/1971 | Jaffe | 310/154 X |
| 3,594,599 | 7/1971 | West | 310/258 |
| 3,663,851 | 5/1972 | Persson | 310/154 |
| 3,939,371 | 2/1976 | Murakami | 310/154 |
| 4,110,718 | 8/1978 | Odor et al. | 310/154 |
| 4,112,320 | 9/1978 | Mohr | 310/154 |
| 4,237,397 | 12/1980 | Mohr | 310/154 |

*Primary Examiner*—Donovan F. Duggan
*Attorney, Agent, or Firm*—Antonelli, Terry & Wands

[57] ABSTRACT

A d.c. dynamoelectric machine of permanent magnet type comprises an armature and a plurality of field poles, wherein each of the poles comprises a main pole part (a permanent magnet) composed by an integral combination of a first magnet formed of a magnetic material having a large coercive force and a second magnet formed of a magnetic material providing a high residual flux density and having an axial length larger than that of the armature core, and an auxiliary pole part juxtaposed and coupled to the permanent magnet and having a permeability higher than the reversible permeability of the permanent magnet, and an air gap for intercepting the path of leakage flux is defined between the permanent magnet and the auxiliary pole part.

17 Claims, 7 Drawing Figures

ROTATING DIRECTION OF ARMATURE

DIRECT CURRENT DYNAMOELECTRIC MACHINE OF PERMANENT MAGNET TYPE

This invention relates to a direct current dynamoelectric machine of the type using a permanent magnet in its field system, and more particularly to a machine of the kind above described which is suitable for use as a starter for an internal combustion engine.

As is commonly known, a d.c. motor of permanent magnet type used as a starter for an internal combustion engine has preferably the characteristics of a d.c. series motor.

A d.c. dynamoelectric machine which employs permanent magnets in its field system, which does not include any special windings in its field system and which has the characteristics of a d.c. series motor, is disclosed in U.S. Pat. No. 3,594,599. In the disclosed d.c. dynamoelectric machine, a main pole part in the form of a permanent magnet and an auxiliary pole part formed of a material having a reversible permeability higher than that of the permanent magnet are juxtaposed to constitute each of a plurality of field poles, so that the flux density is increased beneath the permanent magnet by the armature reaction to provide the characteristics of a d.c. series motor.

Although the balance between the economy and the performance of the disclosed d.c. dynamoelectric machine is achieved when the axial length $L_M$ of the permanent magnet and the axial length $L_P$ of the auxiliary pole part relative to the thickness $L_A$ of the laminated armature core are selected to satisfy the relation $L_M/L_A = L_P/L_A = 1.1-1.4$, no increase in the effective flux density can be expected even when the lengths $L_M$ and $L_A$ are further increased.

However, it has been experimentally clarified by the inventors that the torque performance tends to increase with the increase in the ratio $L_M/L_A$ regardless of the amount of magnetic flux produced in the no-loaded condition. It has thus been confirmed that the general theory above described does not necessarily hold in a motor such as a starter motor in which a large current flows through its armature in a heavy loaded condition, and a demagnetizing field is applied to the permanent magnet by the strong armature reaction. Further, from the viewpoint of design of the characteristics including the torque and rotation speed of such a motor, it is desirable to minimize the tendency of permanent demagnetization (irreversible demagnetization) of the permanent magnet due to the armature reaction.

An example of a permanent magnet type d.c. motor adapted to operate with the characteristics of a d.c. series motor thereby increasing the resistance withstanding the demagnetization is disclosed in Japanese patent application No. 39907/73. In each field pole extending along the circumferential direction of the armature of the d.c. motor disclosed in the cited patent application, a magnet having a large coercive force (Hc) is disposed in the end region to which the armature reaction applies the strongest flux-density decreasing action, and a magnet providing a high residual flux density (Br) is disposed in the central region subjected to a weak flux-density decreasing action and a weak flux-density increasing action.

However, with such a prior art arrangement of merely juxtaposing such magnets, the magnetic flux cannot necessarily be fully effectively utilized, and there is a limitation to the desired increase in the motor output. Further, in the d.c. motor disclosed in the cited patent application, the relation between the axial length of the armature core and the those of the magnets required for the desired increase in the motor output is not taken into consideration, and, therefore, the fully effective utilization of the magnetic flux from the poles cannot be achieved. From this point too, the desired increase in the motor output cannot be finally achieved.

It is therefore a primary object of the present invention to provide a permanent magnet type starter motor in which the arrangement of the combination of the magnets of different kinds is improved, and the ratio between the axial length of the combined magnets and that of the armature core is taken as a factor of design, so that the motor can produce higher torque and operate with improved performance.

The permanent magnet type motor according to the present invention is featured by the fact that each of its field poles comprises a main pole part which is in the form of a permanent magnet composed by an integral combination of a first magnet formed of a magnetic material having a large coercive force (Hc) and a second magnet formed of a magnetic material providing a high residual flux density (Br) and having an axial length larger than that of the armature core, and an auxiliary pole part juxtaposed and coupled to the permanent magnet and having a permeability higher than the reversible permeability of the permanent magnet, and an air gap for intercepting the leakage flux is disposed between the permanent magnet and the auxiliary pole part.

The above and other objects, features and advantages of the present invention will be apparent from the following detailed description of preferred embodiments thereof taken in conjunction with the accompanying drawings, in which.

Preferred embodiments of the present invention will now be described in detail with reference to the drawings.

Figure 1:
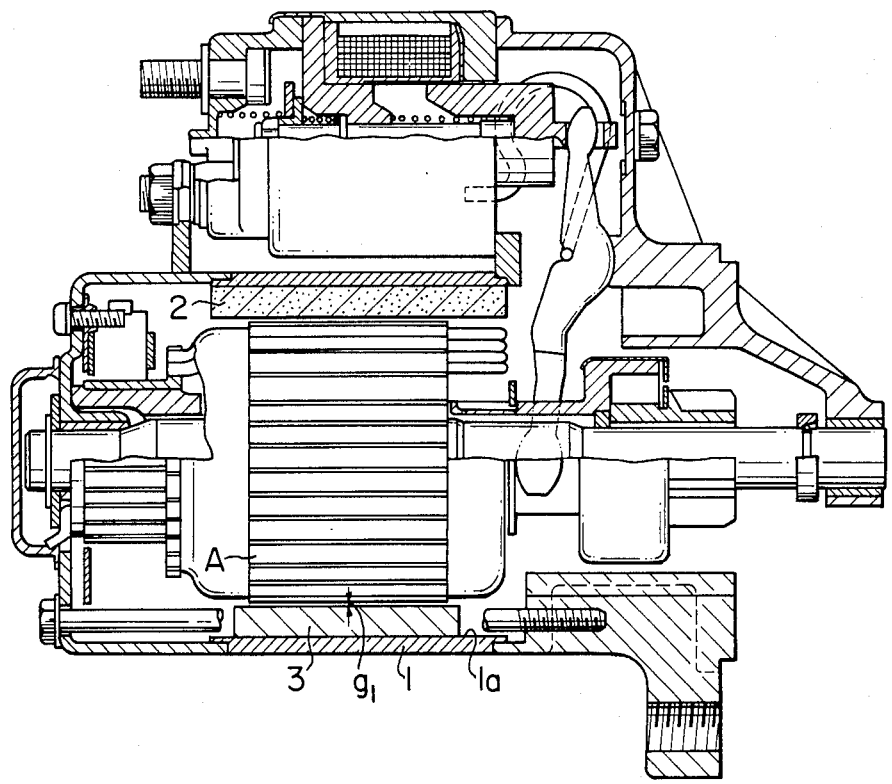
FIG. 1 is a sectional view of main part of an embodiment of the permanet magnet type d.c. motor according to the present invention when the motor is utilized as a starter for starting an internal combustion engine.
Figure 2:
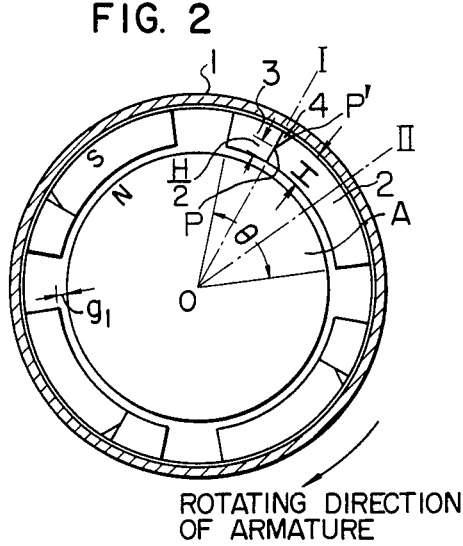
FIG. 2 is a side elevation view showing the arrangement of elements in the yoke part of the motor shown in FIG. 1.

FIG. 1 shows an embodiment of the d.c. dynamoelectric machine of permanent magnet type according to the present invention when adapted to operate as a starter for an internal combustion engine, and description will be principally directed to the structure of its motor part. Referring to FIG. 1, four arcuate permanent magnets 2 formed of an isotropic ferrite are disposed in circumferentially equally spaced apart relation on the inner peripheral surface 1a of a yoke 1 and are fixed thereto by means such as an adhesive. As shown in FIG. 2, each of these permanent magnets 2 has its both end faces cut along radial lines extending radially from the center O of the rotor shaft, and, on the side where the flux density is decreased by the armature reaction, an auxiliary pole part 3 formed of iron is disposed to be intimately coupled at one of its side faces to the mating side face of the permanent magnet 2.

As also shown in FIG. 2, an air gap 4 is formed in the path of leakage flux between the permanent magnet 2 and the associated auxiliary pole part 3 so as to prevent the tendency of leakage of magnetic flux toward the auxiliary pole part 3 from the portion of the permanent magnet 2 bordered by the radial center thereof due to the peculiar properties of an isotropic magnet. Such an air gap 4 is formed by partially cutting one end side of the permanent magnet 2 adjacent to the auxiliary pole 3 along a cutting line P—P' parallel to the line O-II which is a center line of the permanent magnet 2 so that the air gap is defined by a plane which is parallel to the line O-II and intersects the end side of the permanent 2 at a line auxiliarly extending the center P of the thickness H of the end side. The neutral point between the N and S poles of the permanent magnet 2 lies at the point of ½ H. Thus, the air gap 4 extends at least from the outer peripheral point to the neutral point of the permanent magnet 2, so that leakage of magnetic flux can be sufficiently prevented to increase the rotation torque by about 3 to 5%.

The pole enclosure of the 4-pole machine shown in FIG. 1 will now be considered. When the combination of the permanent magnet 2 and the auxiliary pole part 3 shown in FIG. 2 defines an angle $\theta$ with respect to the center O of the rotary shaft, the pole enclosure, which is generally given by $\theta/360°$/number of poles, is selected to take the following value:

$$\theta/90° = 0.7 \sim 0.8$$

Thus, the value of $\theta$ is about 70° and is similar to that generally employed in conventional d.c. dynamoelectric machines.

The larger the pole enclosure, the amount of no-load magnetic flux after magnetization becomes correspondingly larger. However, the performance of the machine cannot be improved since the rate of flux density decrease tends to increase due to the tendency of being adversely affected by the armature reaction decreasing the flux density. For this reason, selection of a large value for the pole enclosure is not effective even when the permanent magnet 2 of an isotropic ferrite is employed, and the ratio $\theta/90°$ of about 0.7 or 0.8 is economically advantageous for reducing the amount of the magnet material. Therefore, in order to increase the amount of effective flux within the range of the pole enclosure specified above, it is most effective to intercept the path of leakage flux in the manner above described.

Figure 3:
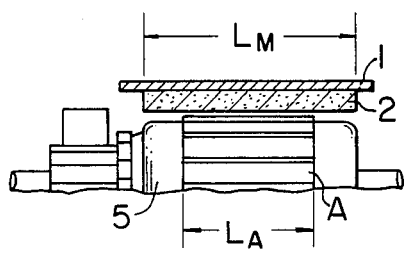
FIG. 3 is a schematic view showing the relation between the permanent magnet and the armature core in the motor of the present invention.

Referring to FIG. 3, the axial length $L_M$ of the permanent magnet 2 providing the main pole part is selected to be larger than that $L_A$ of the armature core A. As an actual value of the axial length $L_M$ of the permanent magnet 2, this length $L_M$ is selected to be 1.5 to 2.0 times as long as the axial length (the thickness of lamination) $L_A$ of the armature core A in the embodiment of the present invention. In view of the fact that the armature reaction is strong in the starter motor shown in FIG. 1, it is desirable that the axial length $L_M$ of the permanent magnet 2 is as large as possible within the allowable space and is selected to be about 2.0 times as long as that $L_A$ of the armature core A. In the axial length $L_M$ of the permanent magnet 2 disposed opposite to the armature core A, the portion which is 1.0 to 1.3 times as long as the axial length $L_A$ of the armature core A is subjected to the severest flux-density decreasing action due to the armature reaction. Therefore, the arrangement shown in FIG. 3 provides increased end regions which are less affected by the flux-density decreasing action due to the armature reaction.

Figure 4:
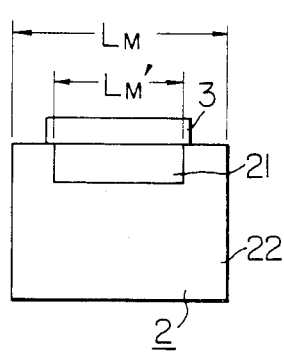
FIG. 4 is a developed side view showing schematically the relation between the permanent magnet and the auxiliary pole part forming the pole in the motor of the present invention.
Figure 5:
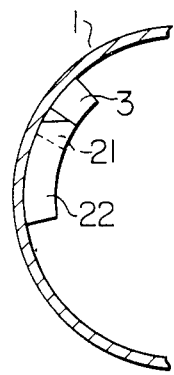
FIG. 5 is a side elevation view showing schematically the pole shown in FIG. 4 when mounted in position.

FIG. 4 is a developed side view showing schematically the relation between the permanent magnet 2 and the auxiliary pole part 3 in the starter motor embodying the present invention, and FIG. 5 is a side elevation view showing schematically the pole shown in FIG. 4 when mounted in position. FIG. 4 shows the relative positions of two magnets combined to form the permanent magnet 2. Referring to FIG. 4, the permanent magnet 2 providing the main pole part in the starter motor embodying the present invention comprises the combination of a first magnet 21 having a high coercive force (Hc) and thus capable of sufficiently withstanding the flux-density decreasing action and a second magnet 22 providing a high residual flux density (Br) and ensuring a high output performance. The first magnet 21 is disposed in the circumferential end portion which is directly opposed by the armature core A and to which the flux-density decreasing action due to the armature reaction is severely imparted, and the second magnet 22 occupying the remaining portion of generally U-like shape is disposed to surround the first magnet 21.

In the embodiment of the present invention, the first magnet 21 disposed in the circumferential end portion to which the flux-density decreasing action due to the armature reaction is imparted, has a high coercive force (Hc) of, for example, 5,000 oresteds and provides a residual flux density (Br) of, for example, 3,000 gauss, while the second magnet 22 occupying the remaining portion provides a high residual flux density (Br) of, for example, 4,400 gauss and has a coercive force (Hc) of, for example, 2,000 gauss. The axial length $L_M'$ of the first magnet 21 is selected to be 1.0 to 1.3 times as long as that $L_A$ of the armature core A, so that it can sufficiently deal with or withstand the severe flux-density decreasing action. When viewed in the axial direction, the second magnet 22 of generally U-like shape engages the both axial end faces of and surrounds the first magnet 21. Such magnets 21 and 22 constituting the permanent magnet 2 may be integrally molded or separately made and assembled. For example, a cut-out or recess may be formed in the second magnet 22, and the first magnet 21 may be fitted and fixed in the cut-out or recess.

The operation of the starter motor of permanent magnet type having such a construction will now be described. When current flows through the armature of the motor, the flux-density decreasing and increasing actions due to the armature reaction are imparted to the permanent magnet 2 on both sides respectively of the circumferential center of the permanent magnet 2, and the strongest armature reaction is imparted to the circumferential end portion of the permanent magnet 2. The area of the permanent magnet 2 opposed directly by the armature core A is subjected to the strong armature reaction. However, as described above, the first magnet 21 having the high coercive force (Hc) is disposed in the area where the flux-density decreasing action is imparted due to the armature reaction. Therefore, the permanent magnet 2 produces the predetermined amount of magnetic flux without being demagnetized by the armature reaction.

The second magnet 22 occupies the end areas of the circumferential end portion of the permanent magnet 2. That is, the second magnet 22 is disposed to occupy both sides of the axial end faces of the first magnet 21, which sides are not directly opposed by the armature core A and are less affected by the flux-density decreasing action. Therefore, the second magnet 22 is not demagnetized, so that the magnetic flux produced by the first and second magnets 21 and 22 function effectively to contribute to the generation of a high output from the motor. Therefore, in the motor producing high torque by the flow of large current through its armature, the magnetic flux from such end areas of the permanent magnet 2 functions also effectively, so that the motor exhibits improved performance over conventional ones of the same dimensions.

A motor structure comprising the combination of a first magnet and a second magnet juxtaposed and coupled to each other has already been proposed as described hereinbefore. However, according to the result of a test conducted by the inventors for providing the superiority of the motor structure of the present invention to the prior art motor structure, a starter motor constructed according to the present invention and comprising a yoke having an outer diameter of 80 mm, an armature core having an axial length of 40 mm and a permanent magnet having an axial length of 75 mm could produce torque improved by about 7% over the prior art motor of juxtaposed magnet structure. This proves clearly that the present invention is excellent over the prior art.

Another embodiment of the present invention will be described with reference to FIG. 6.

In the second embodiment which comprises also the combination of a plurality of magnets, a magnet 22 providing a highest residual flux density among them is disposed to occupy the areas except the area of the permanent magnet 2 opposed directly by the armature core A. Referring to FIG. 6, the permanent magent 2 has an aixal length $L_M$ larger than the axial length (the thickness of lamination) $L_A$ of the armature core A, and a first magnet 21 having a high coercive force occupies the area of the circumferential end portion of the permanent magnet 2 opposed directly by the armature core A. The second magnet 22 providing the highest flux density occupies the remaining area of the circumferential end portion of the permanent magnet 2 and has a generally U-like sectional shape to engage the axial end faces of the first magnet 21 and surround the first magnet 21. A third magnet 23 having magnetic characteristics intermediate between those of the first and second magnets 21 and 22 is interposed between the first and second magnets 21 and 22. The second magnet 22 providing the highest residual flux density engages also the axial end faces of the third magnet 22.

In this second embodiment too, the first magnet 21 having the strong coercive force occupies the area of the circumferential end portion of the permanent magnet 2 which is directly opposed by the armature core A and is subjected to the strong armature reaction. Therefore, the permanent magnet 2 is not demagnetized in this area. On the other hand, the second magnet 22 providing the highest residual flux density occupies the remaining area of the circumferential end portion of the permanent magnet 2 to contribute to the desired increase in the motor output. The desired increase in the motor output can also be attained because of the fact that the second magnet 22 providing the highest residual flux density surrounds the first and third magnets 21 and 23 in the circumferentially central area imparted with flux-density decreasing and increasing actions which are weak enough for demagnetization, and also because of the fact that the second magnet 22 which is selected to provide the highest residual flux density engages the axial end faces of the first and third magnets 21 and 23 or occupies the remaining area of the circumferential end portion of the permanent magnet 2 except the area opposed directly by the armature core A.

Figure 6:
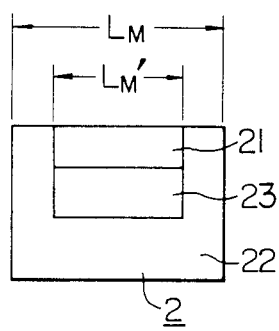
FIG. 6 is a developed side view of the permanent magnet in another embodiment of the present invention.

It will be apparent that the starter motor having the magnet combination shown in FIG. 6 can produce an output higher than that of a prior art one having the same dimensions.

The result of a test conducted by the inventors for the sake of comparison of the performance of the second embodiment with that of a prior art one comprising the combination of juxtaposed magnets, proved that a motor comprising, for example, a yoke having an outer diameter of 80 mm, an armature core having an axial length of 40 mm and a permanent magnet having an axial length of 75 mm, like those described already, could produce torque improved by about 10% over that of the prior art motor.

Figure 7:
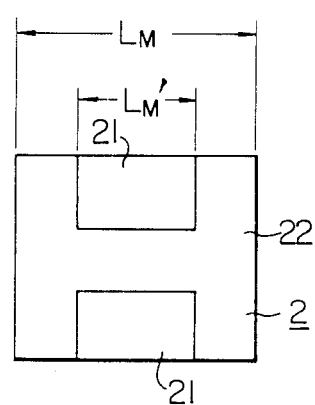
FIG. 7 is a developed side view of the permanent magnet in still another embodiment of the present invention when designed to be reversible.

FIG. 7 shows the structure of the permanent magnet 2 in still another embodiment of the present invention applied to a reversible motor. Referring to FIG. 7, the permanent magnet 2 includes the integral combination of a pair of permanent magnets 21 formed of a difficulty demagnetized material having a large coercive force and an I-shaped permanent magnet 22 formed of a magnetic material providing a high residual flux density. The first permanent magnets 21 are disposed in the central areas of the circumferential end portions of the permanent magnet 2, and the second permanent magnet 22 is disposed to occupy the circumferentially central area of the permanent magnet 2 and engage the axial end faces of the first permanent magnets 21. The first permanent magnets 21 may be formed from the combination of magnets having different characteristics as shown in FIG. 6 and may be disposed at the end portions of the permanent magnet 2 in the rotating direction of the rotor shaft.

I claim:

1. A d.c. dynamoelectric machine of permanent magnet type comprising an armature, a yoke disposed in coaxial relation with said armature, and a plurality of field poles fixed to the inner peripheral surface of said yoke and disposed opposite to said armature with an air gap defined therebetween, each of said poles comprising a main pole part which is a permanent magnet having an axial length larger than that of the armature core, and an auxiliary pole part disposed closely adjacent to said permanent magnet on the side to which the flux-density decreasing action is imparted by the armature reaction, said auxiliary pole part having a permeability higher than the reversible permeability of said permanent magnet and coupled to the trailing end of said permanent magnet in the rotating direction of said armature, said permanent magnet including a first magnet disposed in the area subjected more to the flux-density decreasing action by the armature reaction and having a coercive force high enough to withstand the flux-density decreasing action and a second magnet occupying the remaining area subjected less to the flux-density decreasing action and providing a residual flux density higher than that of said first magnet to ensure a high output.

2. A machine as claimed in claim 1, wherein the axial length of said permanent magnet is about 1.5 to 2.0 times as large as the axial length of said armature core.

3. A machine as claimed in claim 1, wherein an air gap is formed between said permanent magnet and said auxiliary pole part coupled to each other, for intercepting the path of leakage flux from said permanent magnet.

4. A machine as claimed in claim 3, wherein said air gap for intercepting the path of leakage flux is formed at a position radially outer relative to the radial center of said pole at the coupled ends of said main and auxiliary pole parts.

5. A machine as claimed in claim 1, wherein the axial length of said auxiliary pole part is selected to be smaller than the axial length of said permanent magnet.

6. A machine as claimed in claim 1, wherein said first magnet disposed in the area subjected to the flux-density decreasing action is fitted and fixed in a cut-out or recess formed in said second magnet.

7. A machine as claimed in claim 6, wherein a third magnet having characteristics intermediate between those of said first and second magnets is disposed in said cut-out or recess at a position inner relative to said first magnet in the rotating direction of said armature.

8. A machine as claimed in claim 6, wherein said first magnet is disposed in each of the both end portions of said second magnet in the rotating direction, of said armature.

9. A machine as claimed in claim 7, wherein said first magnet is disposed in each of the both end portions of said second magnet in the rotating direction of said armature.

10. A direct current dynamoeletric machine of permanent magnet type having an armature, a yoke disposed in coaxial relation with said armature, and a plurality of field poles fixed on the inner peripheral surface of said yoke and disposed opposite to said armature with an air gap defined therebetween, each of said field poles comprising:
(a) a main pole including
(1) a first magnet having high coercive force and opposed to an area of said armature providing a strong demagnetizing action, and
(2) a second magnet having higher residual flux density than that of said first magnet and opposed to another area of said armature providing a weak demagnetizing action; and
(b) an auxiliary pole having high permeability and disposed closely adjacent and connected to a circumferential end of said first magnet, wherein a width of said auxiliary pole is selected to be shorter than a width of said magnet in the direction of the machine axis.

11. A direct current dynamoelectric machine according to claim 10, wherein an air gap is formed at an outward portion between said first magnet and said auxiliary pole.

12. A direct current dynamoelectric machine according to claim 10, wherein the width of said auxiliary pole is substantially constant and is always shorter than the width of said second magnet.

13. A direct current dynamoelectric machine according to claim 10, wherein said main pole has a width in the direction of the machine axis greater than the width of said armature.

14. A direct current dynamoelectric machine of permanent magnet type having an armature, a yoke disposed in coaxial relation with said armature, and a plurality of field poles fixed on the inner peripheral surface of said yoke and disposed opposite to said armature with an air gap defined therebetween, each of said field poles comprising:
(a) a main pole including
(1) a first magnet having high coercive force and opposed to an area of said armature providing a strong demagnetizing action, and
(2) a second magnet having higher residual flux density than that of said first magnet and opposed to another area of said armature providing a weak demagnetizing action, said second magnet having a recess in its portion subjected to the demagnetizing action and said first magnet being disposed in the recess; and
(b) an auxiliary pole having high permeability and disposed closely adjacent and connected to an end of said first magnet.

15. A direct current dynamoelectric machine according to claim 14, wherein a third magnet having a characteristic intermediate between the characteristics of said first and second magnets is disposed between said first and second magnets.

16. A direct current dynamoelectric machine according to claim 14, wherein said first magnet is disposed in both ends of said second magnet in the direction of the rotation of the armature.

17. A direct current dynamoelectric machine according to claim 15, wherein said first and third magnets are disposed in both ends of said second magnet.

* * * * *